July 8, 1947.  G. A. TINNERMAN  2,423,627
ELECTRICAL CONDUIT CLAMP
Filed March 15, 1944
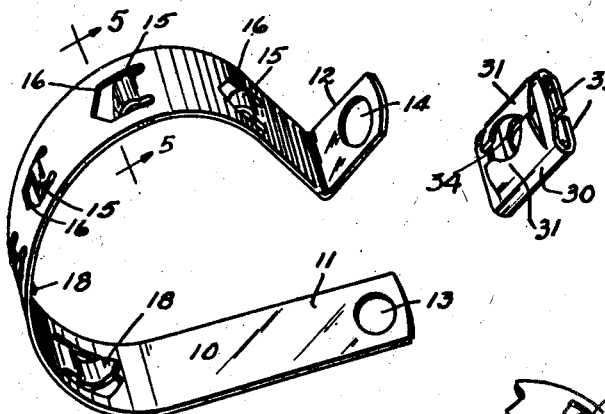
Fig. 1
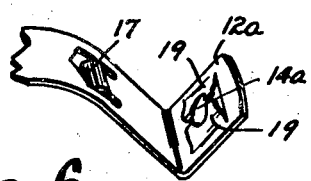
Fig. 2
Fig. 6
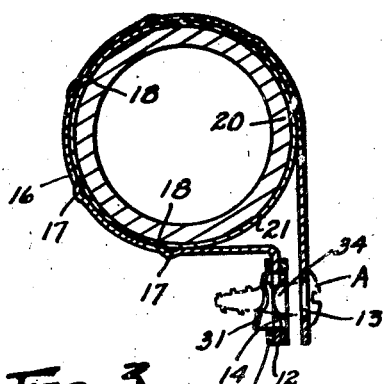
Fig. 3
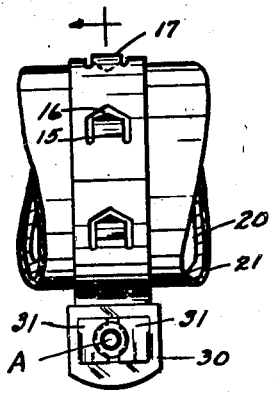
Fig. 4
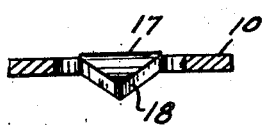
Fig. 5
INVENTOR.
GEORGE A. TINNERMAN
BY
ATTORNEYS Patented July 8, 1947

2,423,627

UNITED STATES PATENT OFFICE 2,423,627

ELECTRICAL CONDUIT CLAMP

George A. Tinnerman, Cleveland, Ohio, assignor to Tinnerman Products, Inc., Cleveland, Ohio, a corporation of Ohio Application March 15, 1944, Serial No. 526,509

1 Claim. (Cl. 173—273)

This invention relates to a clamping device for embracing a conduit or other object. The purpose of the invention is to provide such a clamp with ready means adapted to form a good electrical connection with the member embraced. Conduits, for example, are frequently enameled or painted and otherwise coated, and to form an electric connection it is customary to remove some of the coating. The object of the present invention is to provide a very simple formation of the clamp itself which will automatically puncture the coating and obtain a good electrical contact with the metal of the conduit by the mere application of the clamp.

My invention will be more apparent from the detailed description hereinafter given of the embodiment illustrated in the drawings.

In the drawings, Fig. 1 is a perspective of one form of my clamp; Fig. 2 is a perspective of a sheet metal nut adapted to be mounted on the clamp; Fig. 3 is a section through the clamp with the nut mounted thereon, the clamp being shown in place on a suitable conduit; Fig. 4 is an elevation of the clamp and conduit shown in Fig. 3; Fig. 5 is a cross section through the clamp, as indicated by the line 5—5 on Fig. 1; Fig. 6 is a fragmentary perspective of a modified form of clamp having its end portion deformed to provide an integral nut.

As shown in Figs. 1 to 4, 10 indicates the body of the clamp, which is a continuous open U-shaped loop of resilient sheet metal having one end arm 11, shown as a tangential continuation of the loop, and another end arm 12 which turns outwardly abruptly from the loop. The two arms 11 and 12 are provided with openings 13 and 14 for the passage of a clamping screw to bind the clamp about the conduit.

20 in Figs. 3 and 4, indicates the conduit which is shown as having a suitable coating 21, exaggerated in thickness in the drawing.

To enable the clamp to contact with the metal body 20 of the conduit, I provide a series of tongues 15 on the clamp which are peculiarly formed as follows:

I make substantially U-shaped slits 16 in the body of the clamp, the two side arms of the U being parallel while the connecting bend is V-shaped. This leaves tongues 15 each with a V-shaped point. Each tongue is intermediately bowed outwardly, as shown at 17, and the point 18 bent inwardly.

It results from the construction described that the clamp has a series of sharp points 18 projecting inwardly beyond the inner periphery of the clamp body and at an abrupt angle to the adjacent surface, and thus when the clamp is attached these sharp points are adapted to project through a coating on the conduit and form a good electric connection with the conduit body.

In place of relying on a usual bolt and nut passing through the openings 13 and 14 to hold the clamp closed, I may provide a sheet metal clip 30, Fig. 2, on one of the legs of the clamp, this clip being deformed to provide a thread-engager for a screw. As shown, this clip has a pair of opposed tongues 31, which extend obliquely away from the body of the clip and have their ends notched and spaced apart, the tongues being warped in opposite direction to provide a helical thread. The clip is turned inwardly at each of its extreme portions 33, which are suitably spaced to provide a bolt opening. One of these extreme portions may carry a rib 34 about the opening to engage in the opening of the clamp and thus lock the clip in place.

The clip constructed and mounted, as described, is illustrated in Figs. 3 and 4, wherein the projection 34 on the under layer of the clip extends into the opening 14 of the clamp, to hold the clip thereon. The tongues 31 provide a nut for the attaching screw A.

In place of using the applied clip on an arm of the clamp, I may form the thread-engager integrally by deformed material of the clamp itself. This is illustrated in Fig. 6, where the abrupt arm 12a of the clamp is shown as deformed to provide a pair of opposed tongues 19 on opposite sides of the bolt opening 14a. These tongues are formed similarly to the tongues 31 of the applied clip and extend upwardly from the arm of the clamp at opposed acute angles and are notched at their ends and warped to define a helical turn.

While either the integral thread attacher of Fig. 6 or the applied thread attaching clip of Figs. 1 to 4 may be employed, I may also use merely the conventional bolt and nut passing through the openings 13 and 14, if desired. In any case, the mere tightening of the screw or bolt effects the desired electric connection between the clamp and the metal of the conduit.

I claim:

A conduit clamp adapted to be applied to a conduit having a painted coating to provide an electrical contact with the conduit through said coating, said clamp comprising a loop of resilient sheet metal, an integral tongue on said loop formed by a cutout area comprising a pair of spaced side slits and end slits merging with each other to define a point at the free end of said tongue and providing a clearance around the tongue, said tongue being bent outwardly from adjacent its junction to the loop and then curved inwardly so that the point of the tongue projects from the inner periphery of the loop at an abrupt angle in position for point engagement with the conduit when the clamp is tightened in order to puncture and project through said painted coating on the conduit into contact with the body of the conduit.

GEORGE A. TINNERMAN.

REFERENCES CITED

The following references are of record in the file of this patent:

UNITED STATES PATENTS

| Number | Name | Date |
| --- | --- | --- |
| 2,355,115 | Schmidt | Aug. 8, 1944 |
| 2,339,093 | Metheny | Jan. 11, 1944 |
| 920,364 | Messner | May 4, 1909 |
| 570,276 | Bull | Oct. 27, 1896 |